US009059898B2

(12) United States Patent  
Mallya et al.

(10) Patent No.: US 9,059,898 B2  
(45) Date of Patent: Jun. 16, 2015

(54) SYSTEM AND METHOD FOR TRACKING CONFIGURATION CHANGES IN ENTERPRISE PRODUCT

(75) Inventors: Nitin Mallya, Bangalore (IN); Thokala Sreeramudu, Bangalore (IN); Vidya Sagar, Bangalore (IN); Arun Venkataramanan, Bangalore (IN); Silpa Uppaiapati, Bangalore (IN); Dhaval Thakkar, Bangalore (IN); Nitin Gakhar, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 195 days.

(21) Appl. No.: 13/300,551

(22) Filed: Nov. 19, 2011

(65) Prior Publication Data

US 2012/0143821 A1 Jun. 7, 2012

(30) Foreign Application Priority Data

Dec. 7, 2010 (IN) .......................... 3691/CHE/2010

(51) Int. Cl.  
*G06F 17/30* (2006.01)  
*H04L 12/24* (2006.01)

(52) U.S. Cl.  
CPC .......... *H04L 41/046* (2013.01); *H04L 41/0853* (2013.01)

(58) Field of Classification Search  
CPC ... G06F 11/3612; G06F 11/3664; G06F 8/71; G06F 17/30088  
USPC .................................................. 707/639, 694  
See application file for complete search history.

(56) References Cited

U.S. PATENT DOCUMENTS

| 5,758,071 | A | | 5/1998 | Burgess et al. |
|---|---|---|---|---|
| 5,961,651 | A | * | 10/1999 | Gittins et al. ............... 714/5.11 |
| 6,282,175 | B1 | | 8/2001 | Steele et al. |
| 6,360,331 | B2 | | 3/2002 | Vert et al. |
| 6,823,376 | B1 | * | 11/2004 | George et al. ................ 709/221 |
| 7,017,076 | B2 | * | 3/2006 | Ohno et al. ..................... 714/15 |
| 7,076,696 | B1 | * | 7/2006 | Stringer ...................... 714/47.3 |
| 7,275,048 | B2 | * | 9/2007 | Bigus et al. ..................... 706/46 |
| 7,426,618 | B2 | * | 9/2008 | Vu et al. ........................ 711/162 |
| 7,461,293 | B2 | * | 12/2008 | Ohno et al. ..................... 714/20 |
| 7,519,625 | B2 | * | 4/2009 | Honami et al. ............... 707/649 |
| 7,685,169 | B2 | * | 3/2010 | Hitz et al. .............. 707/999.201 |
| 7,725,669 | B1 | * | 5/2010 | Bingham et al. ............. 711/162 |
| 8,104,087 | B2 | * | 1/2012 | Quinn et al. .................... 726/22 |
| 8,261,193 | B1 | * | 9/2012 | Alur et al. ...................... 715/742 |
| 8,306,950 | B2 | * | 11/2012 | Adkins et al. ................ 707/639 |
| 8,321,721 | B2 | * | 11/2012 | Soran et al. ................... 714/6.1 |
| 8,321,792 | B1 | * | 11/2012 | Alur et al. ..................... 715/742 |
| 8,335,761 | B1 | * | 12/2012 | Natanzon ..................... 707/626 |
| 8,521,865 | B2 | * | 8/2013 | D'Alo et al. ................. 709/224 |
| 8,782,251 | B2 | * | 7/2014 | Girolamo et al. ............ 709/227 |

(Continued)

*Primary Examiner* — Thanh-Ha Dang  
(74) *Attorney, Agent, or Firm* — GE Global Patent Operation; Mark A. Conklin

(57) ABSTRACT

In one embodiment, an automatic, remote and centralized configuration management system for tracking configuration changes in an enterprise product is provided. The system comprises at least one subsystem forming a part of the enterprise product, an agent coupled to the subsystem, the agent configured for creating one or more configuration snapshots of the subsystem and a configuration manager operably coupled to the agent, the configuration manager configured to communicate with the agent to collect the one or more configuration snapshots so as to track the configuration changes in the enterprise product.

11 Claims, 2 Drawing Sheets

(56) References Cited

U.S. PATENT DOCUMENTS

| | | | |
|---|---|---|---|
| 2003/0084009 A1* | 5/2003 | Bigus et al. | 706/6 |
| 2003/0233571 A1* | 12/2003 | Kraus et al. | 713/200 |
| 2004/0019670 A1* | 1/2004 | Viswanath | 709/223 |
| 2005/0081099 A1* | 4/2005 | Chang et al. | 714/15 |
| 2006/0173935 A1* | 8/2006 | Merchant et al. | 707/204 |
| 2006/0206536 A1* | 9/2006 | Sawdon et al. | 707/200 |
| 2008/0065702 A1* | 3/2008 | Dickerson et al. | 707/202 |
| 2008/0114718 A1* | 5/2008 | Anderson et al. | 707/2 |
| 2008/0148235 A1* | 6/2008 | Foresti et al. | 717/123 |
| 2008/0168311 A1* | 7/2008 | Pietrek | 714/33 |
| 2009/0182605 A1* | 7/2009 | Lappas et al. | 705/8 |
| 2009/0307373 A1* | 12/2009 | Cardone et al. | 709/238 |
| 2010/0169281 A1* | 7/2010 | Atluri et al. | 707/641 |
| 2010/0299653 A1* | 11/2010 | Iyer et al. | 717/121 |
| 2011/0197094 A1* | 8/2011 | Wagner | 714/20 |
| 2011/0247071 A1* | 10/2011 | Hooks et al. | 726/24 |
| 2012/0054152 A1* | 3/2012 | Adkins et al. | 707/623 |
| 2012/0102359 A1* | 4/2012 | Hooks | 714/26 |
| 2012/0254570 A1* | 10/2012 | Emaru et al. | 711/162 |
| 2013/0103808 A1* | 4/2013 | Srinivasa et al. | 709/220 |

\* cited by examiner

SYSTEM AND METHOD FOR TRACKING CONFIGURATION CHANGES IN ENTERPRISE PRODUCT

FIELD OF INVENTION

The invention generally relates to networked systems and more particularly to managing and troubleshooting devices within networks by tracking configuration changes through monitoring of configuration status of devices on the network.

BACKGROUND OF THE INVENTION

Managing and troubleshooting an enterprise product (which usually comprises a large number of loosely coupled systems) is very crucial and essential for the owner of the product. This emphasizes the need of having tools that aid in troubleshooting. Prior art systems do not provide a service engineer with a systematic way of troubleshooting problems. To arrive at a root cause of the problem, the service engineer may need to go through a number of log files, and manually check various states of the system. One of the main tasks that he does in this regard is to check the configuration of various components of the system and see if there are any changes. It is extremely cumbersome and time consuming to do this manually for enterprise failures. Hence there exists a need to simplify this process and automate it.

BRIEF DESCRIPTION OF THE INVENTION

The above-mentioned shortcomings, disadvantages and problems are addressed herein which will be understood by reading and understanding the following specification.

In one embodiment, a method of tracking and auditing configuration changes in an enterprise product is provided. The method comprises steps of receiving a first trigger for creating a configuration snapshot, creating a first configuration snapshot in response to the received first trigger, the first configuration snapshot corresponding to a first time stamp, receiving a second trigger for creating a configuration snapshot, creating a second configuration snapshot in response to the received second trigger, the second configuration snapshot corresponding to a second time stamp, comparing the first and second configuration snapshots to track configuration changes in the enterprise product and displaying the tracked configuration changes.

In another embodiment, an automatic, remote and centralized configuration management system for tracking configuration changes in an enterprise product is provided. The system comprises at least one subsystem forming a part of the enterprise product, an agent coupled to the subsystem, the agent configured for creating one or more configuration snapshots of the subsystem and a configuration manager operably coupled to the agent, the configuration manager configured to communicate with the agent to collect the one or more configuration snapshots so as to track the configuration changes in the enterprise product.

Systems and methods of varying scope are described herein. In addition to the aspects and advantages described in this summary, further aspects and advantages will become apparent by reference to the drawings and with reference to the detailed description that follows.

DETAILED DESCRIPTION OF THE INVENTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
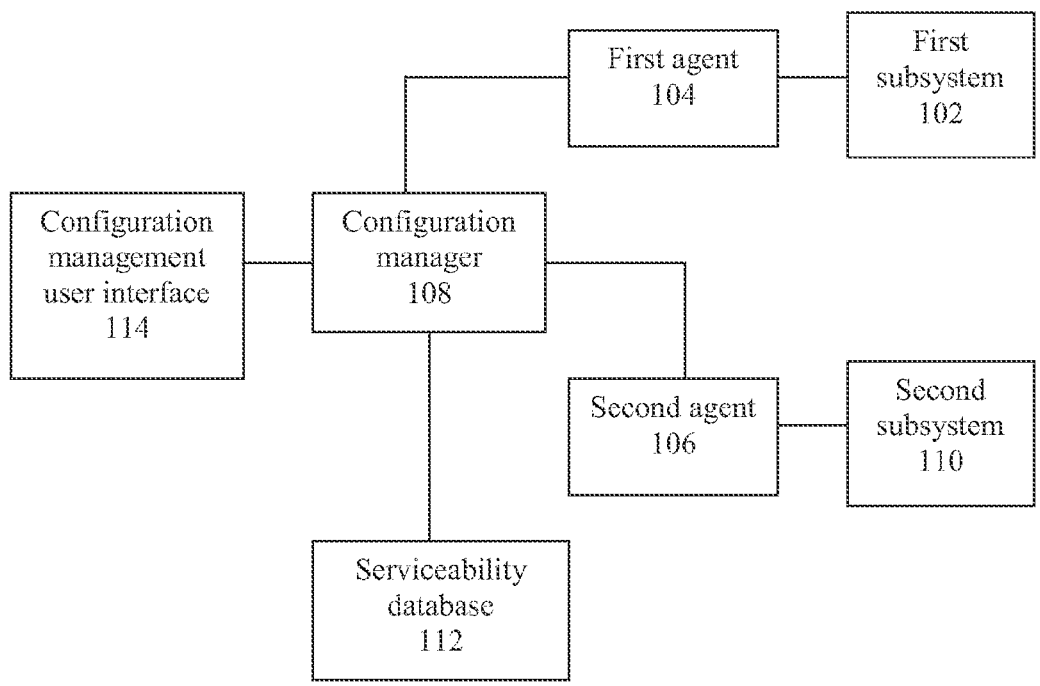
FIG. 1 shows a block diagram of a system for tracking configuration changes in an enterprise product as described in an embodiment.

Turning now to FIG. 1, as described in one embodiment, an automatic, remote and centralized configuration management system 100 for tracking configuration changes in an enterprise product is provided. The system 100 comprises at least one subsystem 102 forming a part of the enterprise product and an agent 104 coupled to the subsystem 102, the agent 104 configured for creating one or more configuration snapshots of the subsystem 102. The system 100 further comprises a configuration manager 108 operably coupled to the agent 104, the configuration manager 108 configured to communicate with the agent 104 to collect the one or more configuration snapshots so as to track the configuration changes in the enterprise product.

The invention provides a mechanism to collect various configurations of an enterprise product and/or distributed system using multiple configuration agents 104 and 106 and create snapshots of these configurations out side the distributed system for example, in a serviceability database 112 located remotely from the enterprise product. Using such a mechanism, various user needs for configuration management such as viewing current and/or any of the previous configurations and comparing configurations are addressed.

In an agent based framework each of the subsystem 102 for which configuration needs to be collected comprises a configuration agent 104 that is capable of collecting the configuration of the subsystem 102. Accordingly, in one exemplary embodiment, the system 100 comprises a first agent 104 coupled to a first subsystem 102 and a second agent 106 coupled to a second subsystem 110. Skilled artisans shall however appreciate that the enterprise product can comprise any number of subsystems wherein each subsystem is coupled to an agent. The first agent 104 and the second agent 106 communicate with the configuration manager 108 through a standard interface.

In one embodiment, the first agent 104 and the second agent 106 communicate with the configuration manager 108 using industry standard communication protocols like JMX and/or web services.

Figure 2:
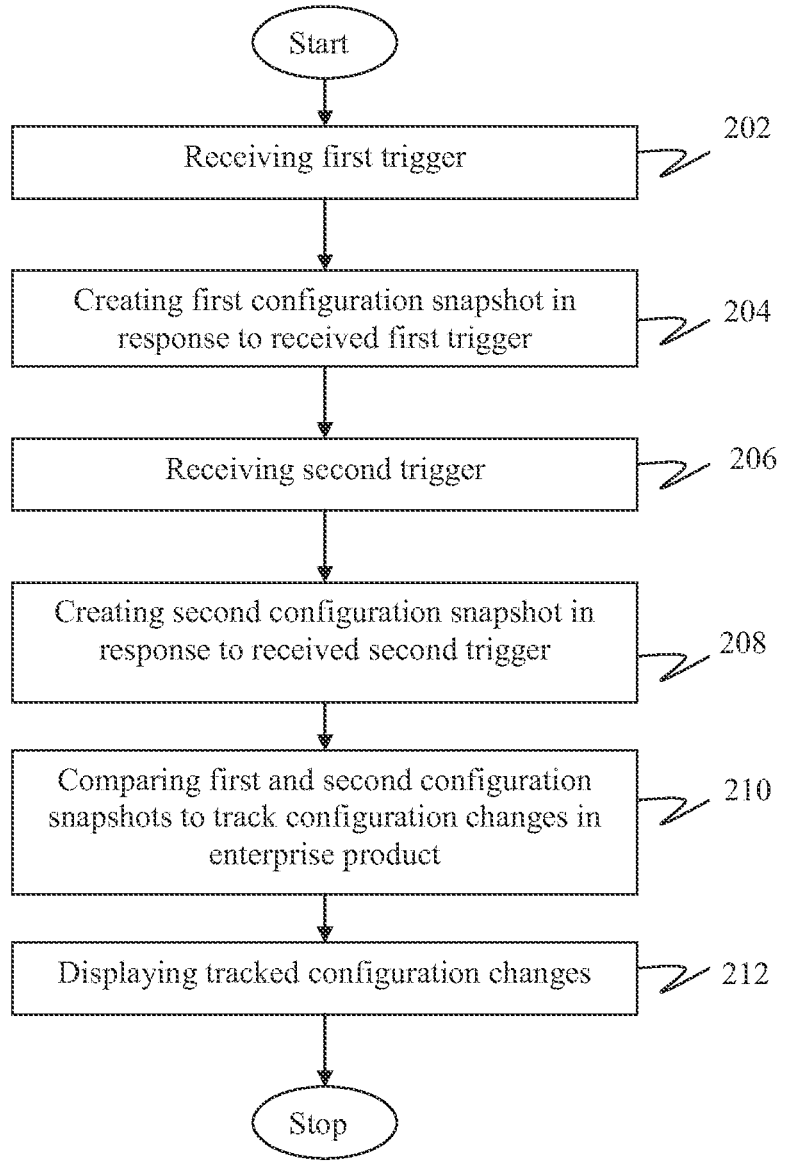
FIG. 2 shows a flow diagram depicting a method of tracking configuration changes in an enterprise product as described in an embodiment.

Turning now to FIG. 2, in one embodiment, a method 200 of tracking configuration changes in an enterprise product is provided. The method 200 comprises steps of receiving a first trigger for creating a configuration snapshot at step 202, creating a first configuration snapshot in response to the received first trigger, the first configuration snapshot corresponding to a first time stamp at step 204, receiving a second trigger for creating a configuration snapshot at step 206, creating a second configuration snapshot in response to the received second trigger, the second configuration snapshot corresponding to a second time stamp at step 208, comparing the first and second configuration snapshots to track configuration changes in the enterprise product at step 210 and displaying the tracked configuration changes at step 212.

The method 200 further comprises storing the first and second configuration snapshots in a serviceability database 112 and retrieving the first and second configuration snapshots from the serviceability database 112. The configuration snapshots are stored outside the enterprise system in the serviceability database 112 located remotely from the enterprise product. This facilitates the review of configuration changes of the enterprise system when the enterprise system is not accessible due to failure.

With reference to FIG. 1, the system 100 further comprises a configuration management user interface 114 coupled to the configuration manager 108. The configuration manager 108 provides the necessary infrastructure for interaction between the configuration management user interface 114, agents 104 and 106 and serviceability database 112 for creating configuration snapshots, viewing and/or editing runtime configuration, and comparing configurations. In one embodiment, the configuration manager 108 and the configuration management user interface 114 may be deployed on a device storing the serviceability database 112.

The method 200 further comprises comparing the first and second configuration snapshots to track configuration changes in the enterprise product. Either of the first and second configuration snapshots may indicate the current configuration of the subsystem 102. Therefore, the system 100 provides a mechanism for the user to view the current configuration of the enterprise system and also any of the previous configuration snapshots collected. The user will have the ability to see a history of all the snapshots created with their metadata such as the time of creation, environment in which it is created.

The ability of the system 100 to provide comparison between two configuration snapshots facilitates troubleshooting. The user will have the ability to compare the current configuration to any of the configuration snapshots collected earlier or compare any of the two previously collected configuration snapshots. The differences in configurations are highlighted to the user.

In one embodiment, the enterprise product may be setup under multiple environments such as production, test and training. The system 100 is configured to manage system configuration across these multiple environments. The configurations can be collected from these different environments. The configuration management user interface 114 is configured to show the list of various configuration snapshots collected from different environments and also provides the ability to compare them. The differences in configuration between any two snapshots and/or between one of the configuration snapshots and the current configuration can be shown to the user. Only the differences and/or various properties can be seen with differences highlighted.

Comparing snapshots of configurations between different environments of the enterprise product is useful. Further, the system 100 is also configured to compare configurations within an environment, for example first application server vs second application server. Further in a clustered and/or load balanced setup the system 100 can be utilized to compare the configuration to two different devices (having similar or disjoint functions) within the cluster.

The method 200 further comprises generating an alert on tracking configuration changes in the enterprise product. For this purpose, the system 100 may comprise an alerting system to notify configured users of changes in system configuration. When a new snapshot is created, a check can be made to see if there are differences in configuration. Following the detection of changes, the configured users for various components can be notified of the change in configuration. The system 100 can be configured to provide support for an escalation hierarchy. Further, knowledge base of resolutions keeps track of who provided the resolution earlier in order to simplify and hasten the resolution process.

The creation of configuration snapshots is based on a trigger. The trigger generated is one of a scheduled, manual and event based trigger. The system 100 is configured to schedule creation of configuration snapshots on a periodic basis. The system 100 can further be configured to compare the current configuration with the previous configuration snapshot prior to creating a successive configuration snapshot. Alternatively, the system 100 may be configured to trigger the snapshot creation following the occurrence of an event. Further, the system 100 may be manually triggered to create a configuration snapshot. Example of event based agents can monitor one or more events and can subsequently trigger the configuration snapshot collection process.

In another embodiment, the agent 104 has the capability to trigger partial configuration collection. If a particular agent 104 detects a change in configuration it can collect the configuration and send it to the configuration manager 108.

Each configuration snapshot comprises one or more configuration values. The configuration values comprise one of static and dynamic configuration values. Example of static configurations would be the properties files that contain configurations. Examples of dynamic configurations are Linux Environment Variables.

The method 200 further comprises steps of determining the validity of the configuration values and generating a notification upon determining the invalidity of the configuration values. The system 100 is configured to validate configurations following collection of each configuration snapshot and notify and/or alert if a certain configuration is not valid. In this regard, the system 100 is configured to create validation rules for different types of configurations. For example, if a database URL is desired to have a predetermined pattern and assuming there is a change in configuration snapshots obtained at different time stamps in which the configuration value corresponding to the configuration snapshot obtained at one of the time stamps is invalid, then following the creation of the configuration snapshot, which is taker determined to be invalid, a validation check is made and an alert is generated. This will help in proactive troubleshooting of issues.

The method 200 further comprises collecting audit information about the configuration snapshot. The system 100 is configured to collect the audit information of various configuration changes. In one exemplary embodiment, the agents 104 and 106 for various subsystem 102 and 110 are adapted to read the log files for identifying audit information of configuration changes and send the audit information along with the configuration snapshots to the configuration manager 108. This provides an improved mechanism to manage the configurations whereby the documentation of who made changes and when is carried out.

In one embodiment, whenever a new system is delivered to the user in the process of providing upgrades to the system, the user needs to configure the system. The system 100 described herein provides configuration tools that aid the user in this process and the user is presented with configuration forms for filling details. The configuration snapshots can be used to partially fill the forms against defaults and previously set configurations. This simplifies the upgradation process.

The method 200 described herein provides a means to simplify the task of tracking configuration changes in an enterprise system using an agent based framework. When configuration is modified and needs to be applied on to the target enterprise system, the framework uses the agents 104 and 106 to apply these changes on to various subsystems 102 and 110.

The main advantage of agent based system is that it can be leveraged to use the most convenient way to collect the configuration of the subsystem. Each of the subsystem may use a different type of agent. Ex: Database, Linux may each require a different type of agent. It provides language independence to the agent as long as it can be accessed using one of the standard communication protocols. Such a framework can be extended to collect the configuration of the legacy products, which are developed using legacy programming languages such as C, VB. Further, the agents can also be employed to collect third party component's configuration.

With such a system, the process of configuration management is automated and can be performed from a remote location using web-based tools. The system setup configuration tool is a web-based tool that can be launched from any remote location using a URL. The service engineer need not access the enterprise system and read through the various configuration files to look for changes, rather it can be done through a web console and the whole process is automatic. This process is also centralized that the configurations of the various subsystems can be managed from a single location.

Further, the system comprises an integrated workflow management and alerting system. When a configuration is modified, it will automatically trigger the corresponding workflows for the configuration changes to take effect.

In various embodiments of the invention, a system and method for tracking configuration changes in an enterprise product are described. However, the embodiments are not limited and may be implemented in connection with different applications. The application of the invention can be extended to other areas, for example networked devices. The design can be carried further and implemented in various forms and specifications.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for tracking configuration changes in an enterprise product of an enterprise system, the system comprising:
    a configuration manager deployed on a device, the configuration manager configured to:
    create a first snapshot of a runtime configuration of the enterprise product responsive to a first trigger, the first snapshot corresponding to a first time stamp;
    create a second snapshot of a runtime configuration of the enterprise product responsive to a second trigger, the second snapshot corresponding to a second time stamp;
    store the first snapshot and the second snapshot to a serviceability database remote from the enterprise system;
    retrieve at least two stored snapshots from the serviceability database;
    compare the at least two retrieved snapshots to track changes to the runtime configuration in the enterprise product; and
    display the tracked runtime configuration changes;
    wherein each configuration snapshot comprises one or more configuration values, the configuration values being at least one of static and dynamic configuration values, wherein the system is configured to create validation rules for different types of configurations and wherein the configuration manager determines the validity of the configuration values based upon the validation rules; and
    generates a notification upon determining invalidity of the configuration values.

2. The system of claim 1, wherein the configuration manager is configured to generate an alert on tracking runtime configuration changes in the enterprise product.

3. The system of claim 1, wherein the configuration manager is configured to collect audit information about at least one of the configuration snapshots.

4. The system of claim 1, wherein the serviceability database is located remotely from the enterprise product.

5. The system of claim 1, wherein each of the first and second triggers generated is one of a scheduled, manual and event based trigger.

6. The system of claim 1, further comprising an agent configured to detect a change in the runtime configuration of the enterprise product, collect the first and second snapshots and transmit the first and second snapshots to the configuration manager.

7. A configuration management system for tracking configuration changes in an enterprise product of an enterprise system, the system comprising:
    at least one subsystem forming a part of the enterprise product;
    an agent coupled to the subsystem, the agent configured for creating one or more snapshots of a runtime configuration of the subsystem;
    a configuration manager user interface and a configuration manager deployed on a device and operably coupled to the agent, the configuration manager configured to store first and second snapshots of the runtime configuration in a serviceability database remote from the enterprise system, retrieve at least two stored snapshots from the serviceability database, and communicate with the agent to collect the one or more retrieved snapshots in order to track changes to the runtime configuration in the enterprise product wherein each configuration snapshot comprises one or more configuration values, the configuration values being at least one of static and dynamic configuration values, and wherein the system is configured to create validation rules for different types of configurations and the configuration manager determines the validity of the configuration values based upon the validation rules; and
    generates a notification upon determining invalidity of the configuration values.

8. The system of claim 7, wherein a first agent is coupled to a first subsystem and a second agent is coupled to a second subsystem and wherein the first agent and the second agent communicate with the configuration manager through a standard interface.

9. The system of claim 8, wherein the first agent and the second agent communicate with the configuration manager using communication protocols comprising JMX and web services.

10. The system of claim 7, wherein the enterprise product is set up in one of environments comprising production, test and training.

11. The system of claim 7, further comprising a configuration management user interface coupled to the configuration manager.

\* \* \* \* \*

UNITED STATES PATENT AND TRADEMARK OFFICE
CERTIFICATE OF CORRECTION

PATENT NO.         : 9,059,898 B2                                          Page 1 of 1
APPLICATION NO.    : 13/300551
DATED              : June 16, 2015
INVENTOR(S)        : Mallya et al.

It is certified that error appears in the above-identified patent and that said Letters Patent is hereby corrected as shown below:

In the specification

In Column 1, Line 31, delete "(problems" and insert -- problems --, therefor.

In Column 4, Line 6, delete "hasten" and insert -- fasten --, therefor.

In Column 4, Line 43, delete "taker" and insert -- later --, therefor.

Signed and Sealed this
Twenty-third Day of February, 2016

Michelle K. Lee
*Director of the United States Patent and Trademark Office*